United States Patent
Anderson et al.

(10) Patent No.: US 8,601,040 B2
(45) Date of Patent: Dec. 3, 2013

(54) REDUCED-LEVEL SHIFT OVERFLOW DETECTION

(75) Inventors: Timothy D. Anderson, Dallas, TX (US); Shriram D. Moharil, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 579 days.

(21) Appl. No.: 12/891,718

(22) Filed: Sep. 27, 2010

(65) Prior Publication Data

US 2012/0079240 A1  Mar. 29, 2012

(51) Int. Cl.
*G06F 15/00* (2006.01)
(52) U.S. Cl.
USPC .......................................................... 708/209
(58) Field of Classification Search
USPC .......................................................... 708/209
See application file for complete search history.

(56) References Cited

U.S. PATENT DOCUMENTS 6,209,012 B1 * 3/2001 Baudendistel ................ 708/209
6,381,295 B1 * 4/2002 Lin ................................. 377/69

* cited by examiner

*Primary Examiner* — Tan V. Mai
(74) *Attorney, Agent, or Firm* — Robert D. Marshall, Jr.; Wade James Brady, III; Frederick J. Telecky, Jr.

(57) ABSTRACT

A processor includes a shift overflow detector for rapidly detecting overflows that may result during execution of a shift instruction. Shift indication signals are generated in response to changes in logic state between adjacent pairs of bits of a received shift data word. A received shift amount is decoded to produce decoded shift signals that indicate an amount of shifting for the received shift data word. An overflow condition is detected in response to the generated shift indication signals and the decoded shift signals and an indication of the detected overflow condition is provided.

17 Claims, 6 Drawing Sheets

REDUCED-LEVEL SHIFT OVERFLOW DETECTION

BACKGROUND

One type of the instructions used in general-purpose DSP processors is a shift instruction. A shift instruction is typically a two-operand instruction. In the execution of this instruction, the data to be shifted is typically contained in one of the source operands while the amount by which the data needs to be shifted is contained in the other. A saturate condition occurs if there is an overflow in the result, when the shift data is left-shifted by the shift amount. For the specific example of signed 32-bit data, the result is limited to 0x7FFFFFFFh, which is thus considered to be the highest positive number that can be accurately represented as signed 32-bit data. The computation of this condition is often part of a timing critical path, especially if the instruction is to be executed in a single cycle, and thus can be limiting to the speed of a DSP.

SUMMARY

The problems noted above are solved in large part by a processor as disclosed herein that includes a shift overflow detector for rapidly detecting overflows that may result during execution of a shift instruction. Shift indication signals are generated in response to changes in logic state between adjacent pairs of bits of a received shift data word. A received shift amount is decoded to produce decoded shift signals that indicate an amount of shifting for the received shift data word. An overflow condition is detected in response to the generated shift indication signals and the decoded shift signals and an indication of the detected overflow condition is provided.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection may be through a direct electrical connection, or through an indirect electrical connection via other devices and connections.

Figure 1:
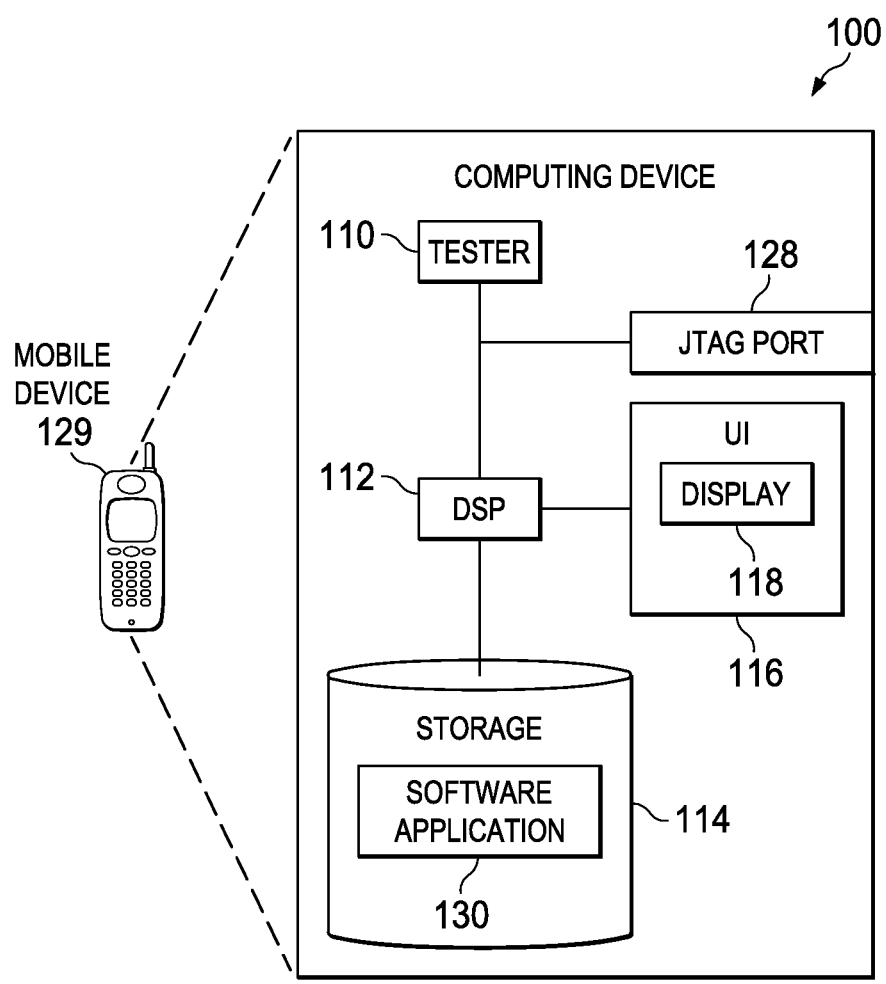
FIG. 1 shows an illustrative computing device 100 in accordance with embodiments of the disclosure.

FIG. 1 shows an illustrative computing device 100 in accordance with embodiments of the disclosure. The computing device 100 may be, or may be incorporated into, a mobile communication device 129, such as a mobile phone, a personal digital assistant (e.g., a BLACKBERRY® device), a personal computer, or any other type of electronic system.

In some embodiments, the computing device 100 comprises a megacell or a system-on-chip (SoC) which includes control logic such as a processor (which, for example, can be a CISC-type CPU, RISC-type CPU, or a digital signal processor (DSP) 112), a storage 114 (e.g., random access memory (RAM)) and tester 110. The storage 114 stores one or more software applications 130 (e.g., embedded applications) that, when executed by the DSP 112, perform any suitable function associated with the computing device 100. The tester 110 comprises logic that supports testing and debugging of the computing device 100 executing the software application 130. For example, the tester 110 may emulate a defective or unavailable component(s) of the computing device 100 so that a software developer may verify how the component(s), were it actually present on the computing device 100, would perform in various situations (e.g., how the component(s) would interact with the software application 130). In this way, the software application 130 may be debugged in an environment which resembles post-production operation.

The DSP 112 typically comprises memory and logic which store information frequently accessed from the storage 114. The computing device 100 is often controlled by a user using a UI (user interface) 116, which typically provides output to and receives input from the user during the execution the software application 130. The output may be provided using the display 118, a speaker, vibrations, and the like. The input may be received using audio inputs (using, for example, voice recognition), and mechanical devices such as keypads, switches, proximity detectors and the like. These and other input and output devices may be coupled to the computing device 100 by external devices using wireless or cabled connections.

The DSP (and/or other kinds of processors) as disclosed herein includes a shift overflow detector for rapidly detecting overflows that may result during execution of a shift instruction. Shift indication signals are generated in response to changes in logic state between adjacent pairs of bits of a received shift data word. A received shift amount is decoded to produce decoded shift signals that indicate an amount of shifting for the received shift data word. An overflow condition is detected in response to the generated shift indication signals and the decoded shift signals and an indication of the detected overflow condition is provided.

One of the instructions used in general-purpose DSP processors is a "Left-Shift with Saturation" and is typically handled in a separate sub-unit dedicated to performing shift instructions. Saturation detection is used to limit the value of the results when the magnitude of the shifted operand can no longer be accurately represented in the data widths used. The left-shift with saturation is typically a two-operand instruction. In the execution of this instruction, the data to be shifted is typically contained in one operand while the amount by which the data is to be shifted is contained in another operand. The saturate condition occurs when there is an overflow in the result that occurs when the shift data is left-shifted by the shift amount. In the specific example of signed 32-bit data, the highest valid result is thus limited to 0x7FFFFFFFh, which is the highest positive number that can be accurately represented using such signed 32-bit data.

As disclosed herein, the DSP 112 includes a reduced-level shift overflow detection unit for performing the detection of an overflow condition independently of a conventional shifter operation. The computation of this condition is often a timing critical path, especially when the instruction is to be executed in a single cycle. Accordingly, the reduced-level shift overflow detection unit reduces the number of logic levels involved in the computation of the saturate condition to improve operating frequencies of processors. An embodiment is disclosed that uses 32-bit signed shift data and an encoded 5-bit unsigned shift amount. The techniques disclosed herein can be extended to reduce the number of logic levels in the computation of the saturation condition for larger (or smaller) bit-widths of shift data and shift amounts.

Figure 2:
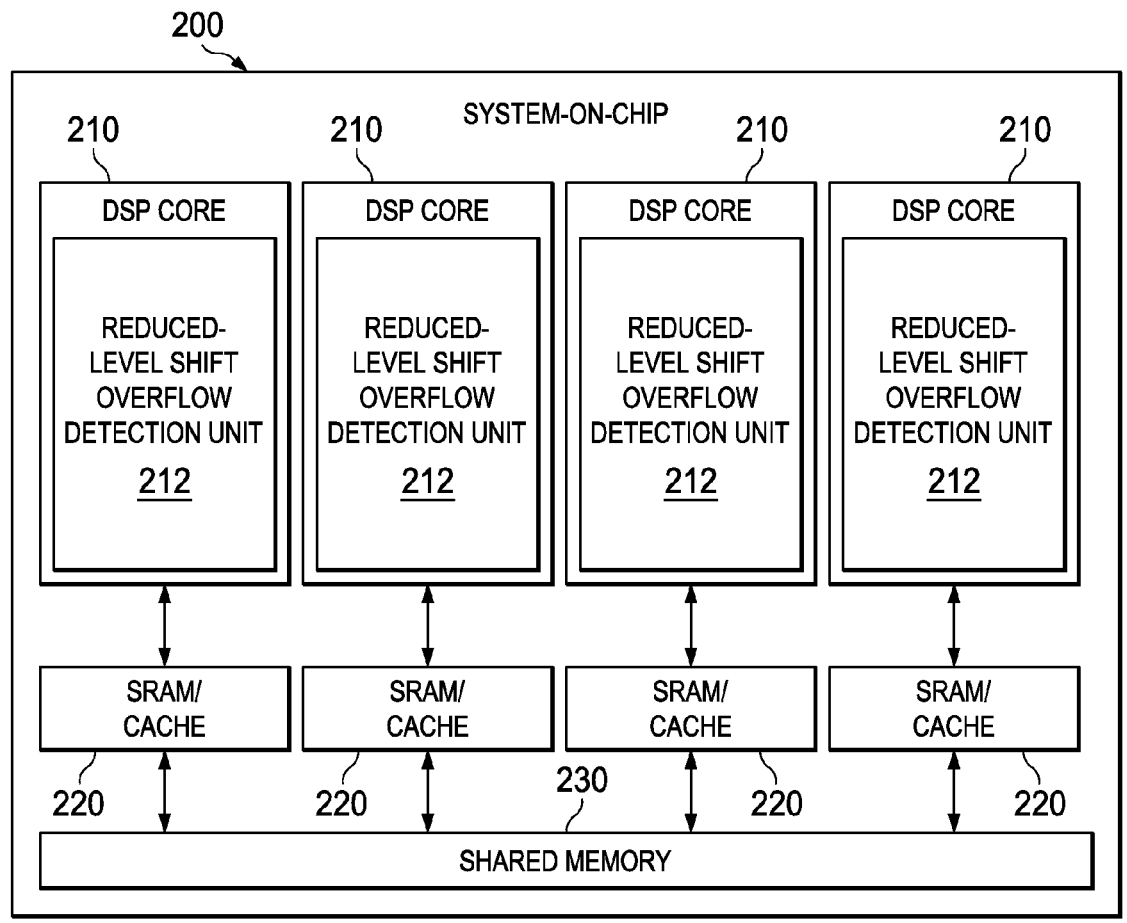
FIG. 2 is a block diagram illustrating a computing system including a reduced-level shift overflow detection unit in accordance with embodiments of the disclosure.

FIG. 2 is a block diagram illustrating a computing system including a reduced-level shift overflow detection unit in accordance with embodiments of the disclosure. Computing system 200 is illustrated including one or more DSP cores 210, SRAM/Caches 220, and shared memory 230. Often the illustrated elements of the computing system 200 are formed using a common substrate although the elements may be implemented in separate circuit boards and packages (including the shared memory 230).

Each DSP core 210 optionally includes a reduced-level shift overflow detection unit 212 for improving the cycle times of certain shift instructions. Each DSP core 210 has a local memory such as SRAM/Cache 220 to provide relatively quick access to read and write memory. Additionally, each DSP core 210 is coupled to a shared memory 230, which usually provides slower (and typically less expensive) memory accesses than SRAM/Cache 220. The shared memory 230 stores program and data information that can be shared between each DSP core 210.

Figure 3:
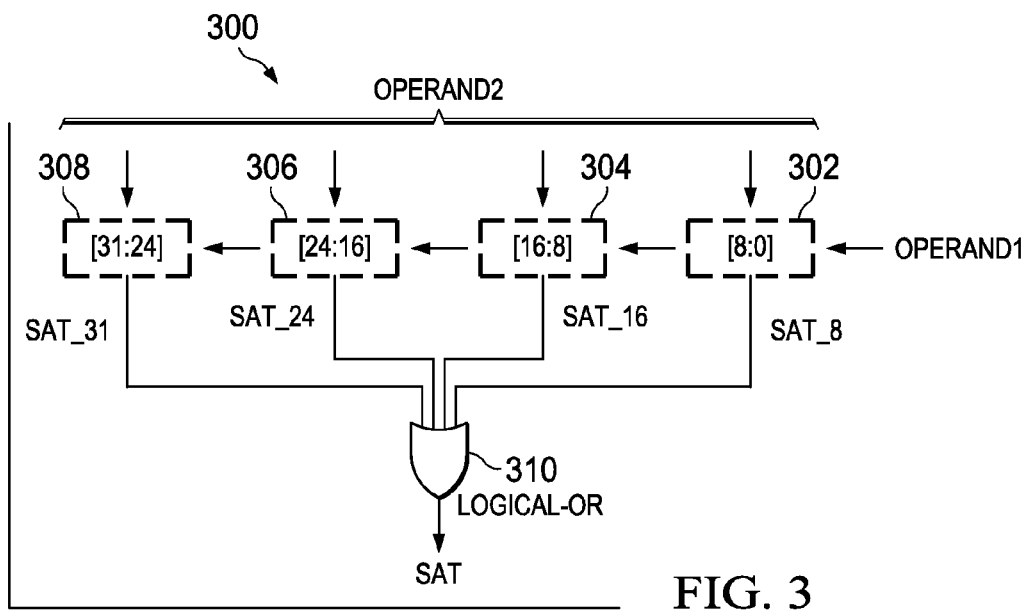
FIG. 3 is a block diagram illustrating a reduced-level shift overflow detection unit in accordance with embodiments of the disclosure.

FIG. 3 is a block diagram illustrating a reduced-level shift overflow detection unit in accordance with embodiments of the disclosure. The reduced-level shift overflow detection unit 300 includes overflow sub-units 302, 304, 306, and 308. The reduced-level shift overflow detection unit 300 receives a data shift word operand (operand2) that includes a 32-bit data word that is to be shifted and a shift amount operand (operand1) that specifies an amount the 32-bit data word is to be shifted. The shift amount operand is encoded as a 5-bit word (which has 32 possible values).

The 32-bit data word of operand2 is divided into four sets of 8 bits each, with each set going to a respective overflow detection sub-unit 302, 304, 306, and 308. Thus, for example, overflow detection sub-unit 302 receives the least significant bits of the shift data word, and overflow detection sub-unit 308 receives the most significant bits of the shift data word. The encoded shift amount operand1 is also provided to each overflow detection sub-unit 302, 304, 306, and 308. The logic in each overflow detection sub-unit 302, 304, 306, and 308 is arranged to detect a saturate condition within that overflow detection sub-unit that would contribute to a saturate condition in the overall shift data. Outputs of each overflow detection sub-unit 302, 304, 306, and 308 are logically-ORed (by using logical OR gate 310, for example) to determine whether a saturation condition exists in the overall shift data of the 32-bit data word. The overflow detection sub-unit 302 (which involves the eight least significant bits of the shift data word) is illustrated below in FIG. 4.

Figure 4:
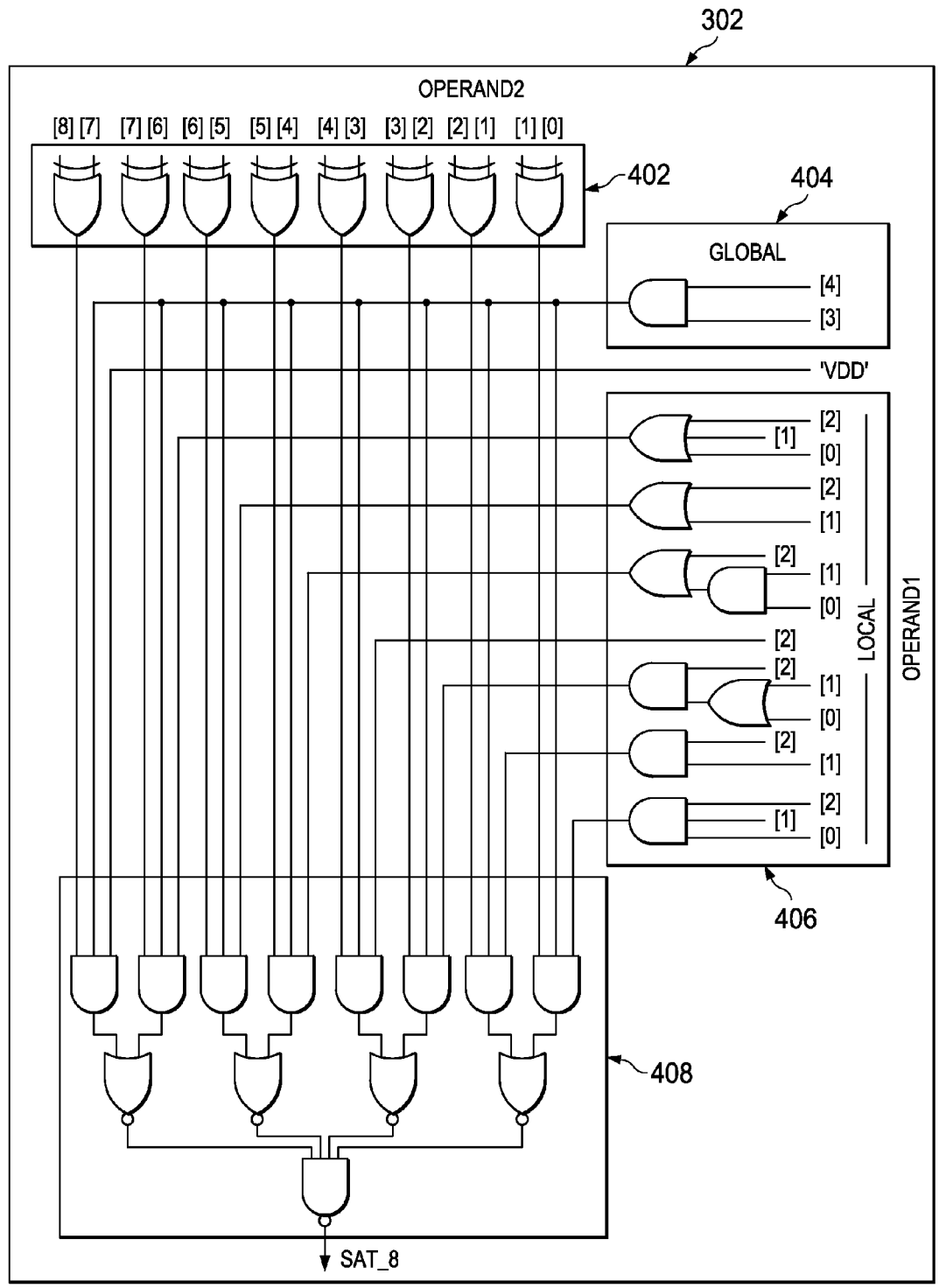
FIG. 4 is a block diagram illustrating a lowest order sub-unit of a reduced level shift overflow detection unit in accordance with embodiments of the disclosure.

FIG. 4 is a block diagram illustrating a sub-unit of a reduced level shift overflow detection unit in accordance with embodiments of the disclosure. In particular, overflow detection sub-unit 302 is illustrated. As shown in FIG. 4, overflow detection sub-unit 302 comprises a change detector 402, a global shift amount decoder 404, a local shift amount decoder 406, and a saturation logic unit 408. Change detector 402 operates by performing a logical comparison between pairs of adjacent bits of the data word to be shifted. The logical comparison can be an XOR (using logical exclusive-OR gates) operation or similar operation using discrete transistors. As illustrated, pairs of adjacent bits of the shift data word are logically compared with each other. Thus, an additional higher order data word bit is used by the change detector 402. For example, the lowest bit of the next higher saturation logic unit (bit 8 of the shift data word of overflow detection sub-unit 304) is provided to overflow detection sub-unit 302 to be logically XORed with bit 7 of the shift data word. The XOR operation is performed to detect a "change" in the bits, namely, that the presence of a "1" in the shifted data is detected. If there is a change at a specific bit position within the set, this potentially results in a local overflow out of the 8-bit set when the shift amount is large enough.

The local shift amount decoder 406 is used to determine whether the lower order bits of the shift amount are large enough such that a detected "change" in the bits of the data word (operand2) is large enough to cause an overflow within overflow detection sub-unit 302. For example, if there is a change detected in bit position 3, then the shift amount must be at least 4 in order to result in a local overflow out of the 8-bit set. This condition is detected by performing a logical AND of the change detection and the minimum shift amount required for this to result in a local overflow out of the 8-bit set. The detection of such an overflow out of this 8-bit set of operand2 is the logical OR of the individual overflow conditions for each bit position within the 8-bit set. Bits [8:0] of operand2 and bits [2:0] of operand1 are used for detecting the local overflow out of this set.

The global shift amount decoder 404 is used to determine whether the higher order bits of the shift amount are large enough such that a detected "change" in the bits of the data word (operand2) is large enough to cause an overflow condition when the overflow detection sub-units are combined. For example, both global[3] and global[4] must be set "high" in order for a shift amount from overflow detection sub-unit 302 to overflow reduced-level shift overflow detection unit 300. This condition is detected by performing a logical AND of global[3] and global[4] as both these bits need to be set in order to generate an overflow in the entire 32-bit data in the data shift word (operand2) under consideration.

The outputs of the change detector 402, the global shift amount decoder 404, and the local shift amount decoder 406 are combined using the saturation logic unit 408. The saturation logic unit 408 output indicates a detection of a local overflow out of this set. The output of the saturation logic unit 408 is logically combined with the outputs of other saturation logic units of other overflow detection sub-units using the reduced-level shift overflow detection unit 300, which is described above with respect to FIG. 3.

In the context of the 32-bit shift data, this needs to be qualified (AND-ed) with the upper (global) bits of the shift amount i.e. bits [4:3] of operand 1, as both these bits are to be set in order to generate an overflow in the entire 32-bit data under consideration. An overflow is thus generated when the change detector 402 indicates a change in logic state between adjacent pairs of bits of received set of bits of the shift data and when the received shift amount is greater than eight bits and when the received shift amount is sufficiently large enough to cause a bit associated with a detected change in logic state between adjacent pairs of bits of received set of bits of the shift data to overflow a most significant level detection sub-unit (such as overflow detection sub-unit 308, described below).

There is a $2^N$ encoding of the shift amount of operand1. For example, bit[0] of operand1 corresponds to a shift amount of one bit, bit[1] corresponds to a shift amount of two bits, bit[2] corresponds to a shift amount of four bits, bit[3] corresponds to a shift amount of eight bits, and bit[4] corresponds to a shift amount of 16 bits. Because the data size of the data word to be shifted (operand2) is 32-bits long, only the lowest bits[4:0] of operand1 are used to determine the shift amount (although other bits of the operand1 could be used). Because a total of 32-bits of shift data are considered in a data word, four such 8-bit sets (with each set being applied to an overflow detection subunit) are used to detect the overall condition for saturation.

The organization of the subunits (and the arrangement of each subunit) in the reduced-level shift overflow detection unit 300 thus provides an exponential reduction in the complexity of the logic (and logic levels) over conventional shift overflow detection units. The overflow detection out of the other three sets is similar to that detailed above, and uses various modifications to the logic equations involving the global bits of operand1 as described further below.

Figure 5:
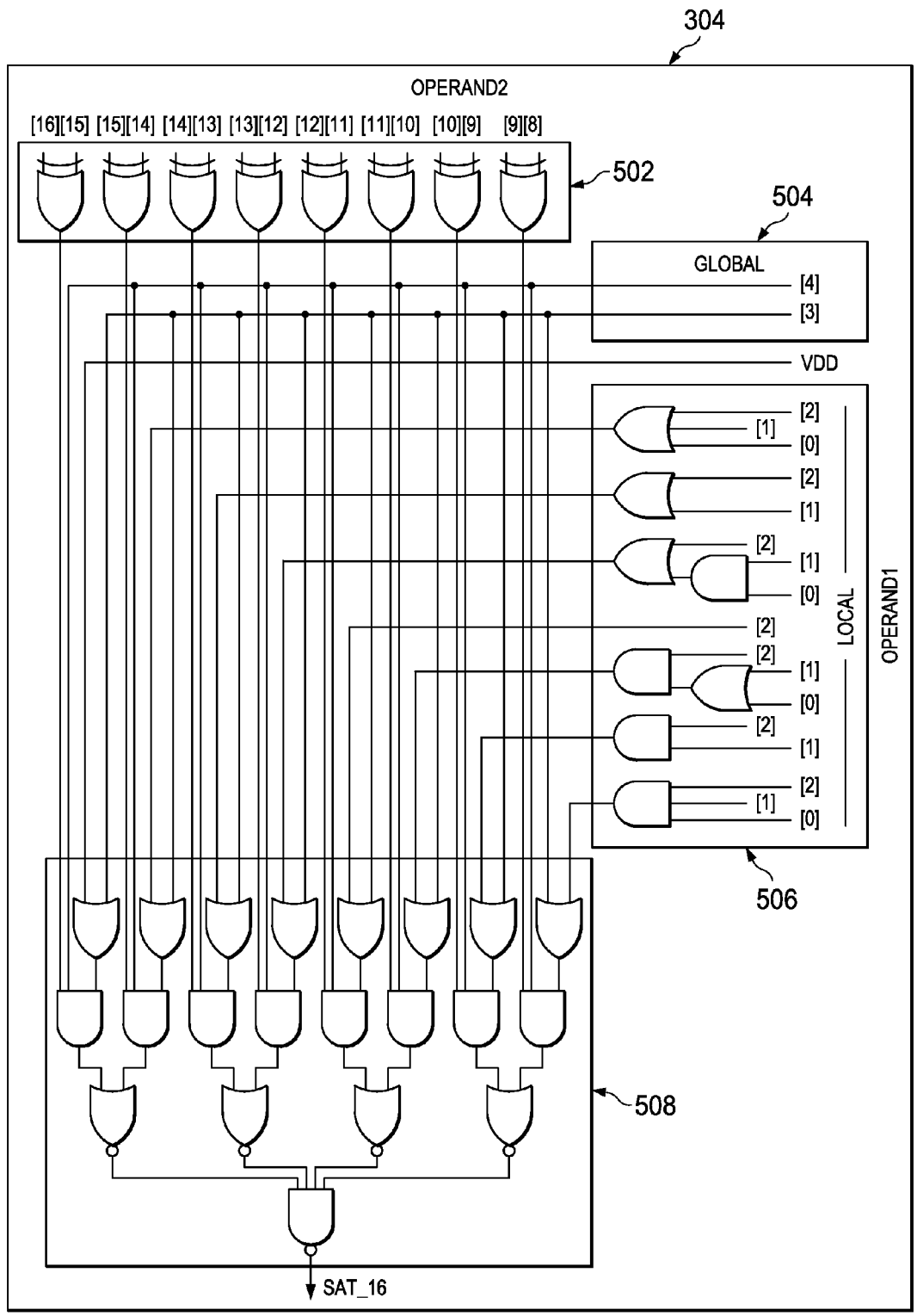
FIG. 5 is a block diagram illustrating a lower order sub-unit of a reduced level shift overflow detection unit in accordance with embodiments of the disclosure.

FIG. 5 is a block diagram illustrating a sub-unit of a reduced level shift overflow detection unit in accordance with embodiments of the disclosure. In particular, overflow detection sub-unit 304 is illustrated. As shown in FIG. 5, overflow detection sub-unit 304 comprises a change detector 502, a global shift amount decoder 504, a local shift amount decoder 506, and a saturation logic unit 508. Change detector 502 operates by performing a logical comparison between pairs of adjacent bits of the data word to be shifted. The logical comparison can be an XOR (using logical exclusive-OR gates) operation or similar operation using discrete transistors. As illustrated, pairs of adjacent bits of the shift data word are logically compared with each other. Thus, an additional higher order data word bit (bit 16) is used by the change detector 502. For example, the lowest bit of the next higher saturation logic unit (bit 16 of the shift data word of overflow detection sub-unit 304) is provided to overflow detection sub-unit 304 to be logically XORed with bit 15 of the shift data word. The XOR operation is performed to detect a "change" in the bits, namely, that the presence of a "1" in the shifted data is detected. If there is a change at a specific bit position within the set, this potentially results in a local overflow out of the 8-bit set when the shift amount is large enough.

The local shift amount decoder 506 is used to determine whether the lower order bits of the shift amount are large enough such that a detected "change" in the bits of the data word (operand2) is large enough to cause an overflow within overflow detection sub-unit 304. This condition is detected by performing a logical AND of the change detection and the minimum shift amount required for this to result in a local overflow out of the 8-bit set. The detection of such an overflow out of this 8-bit set of operand2 is the logical OR of the individual overflow conditions for each bit position within the 8-bit set. Bits [16:8] of operand2 and bits [2:0] of operand1 are used for detecting the local overflow out of this set.

The global shift amount decoder 504 is used to determine whether the higher order bits of the shift amount are large enough such that a detected "change" in the bits of the data word (operand2) is large enough to cause an overflow condition when the overflow detection sub-units are combined. For example, global[4] must be set "high" in order for a shift amount from overflow detection sub-unit 304 to overflow reduced-level shift overflow detection unit 300. Additionally, the logical function of global shift amount decoder 504 is combined with the logical function of saturation logic unit 508 to detect whether the global shift amount is also large enough to cause an overflow in all less significant overflow detection sub-units (in particular, overflow detection sub-unit 302). This additional functionality captures overflows in the event that the number of bits of entire data word to be shifted (operand2) is not evenly divisible by the set size (for example, note that 7FFFFFh occupies 31 bits—which calculation is an anti-logarithmic function—and 31 modulo 8 is 7 and that local shift amount decoder 506 does not by itself handle overflow detection for the highest bit of the set).

An overflow is thus generated when the change detector 502 indicates a change in logic state between adjacent pairs of bits of received set of bits of the shift data and when the received shift amount is greater than eight bits and when the received shift amount is sufficiently large enough to cause a bit associated with a detected change in logic state between adjacent pairs of bits of received set of bits of the shift data to overflow a most significant level detection sub-unit (such as overflow detection sub-unit 308, described below).

The outputs of the change detector 502, the global shift amount decoder 504, and the local shift amount decoder 506 are combined using the saturation logic unit 508. The saturation logic unit 508 output indicates a detection of a local overflow out of this set (handled by overflow detection sub-unit 304). The output of the saturation logic unit 508 is logically combined with the outputs of other saturation logic units of other overflow detection sub-units using the reduced-level shift overflow detection unit 300, which is described above with respect to FIG. 3.

Figure 6:
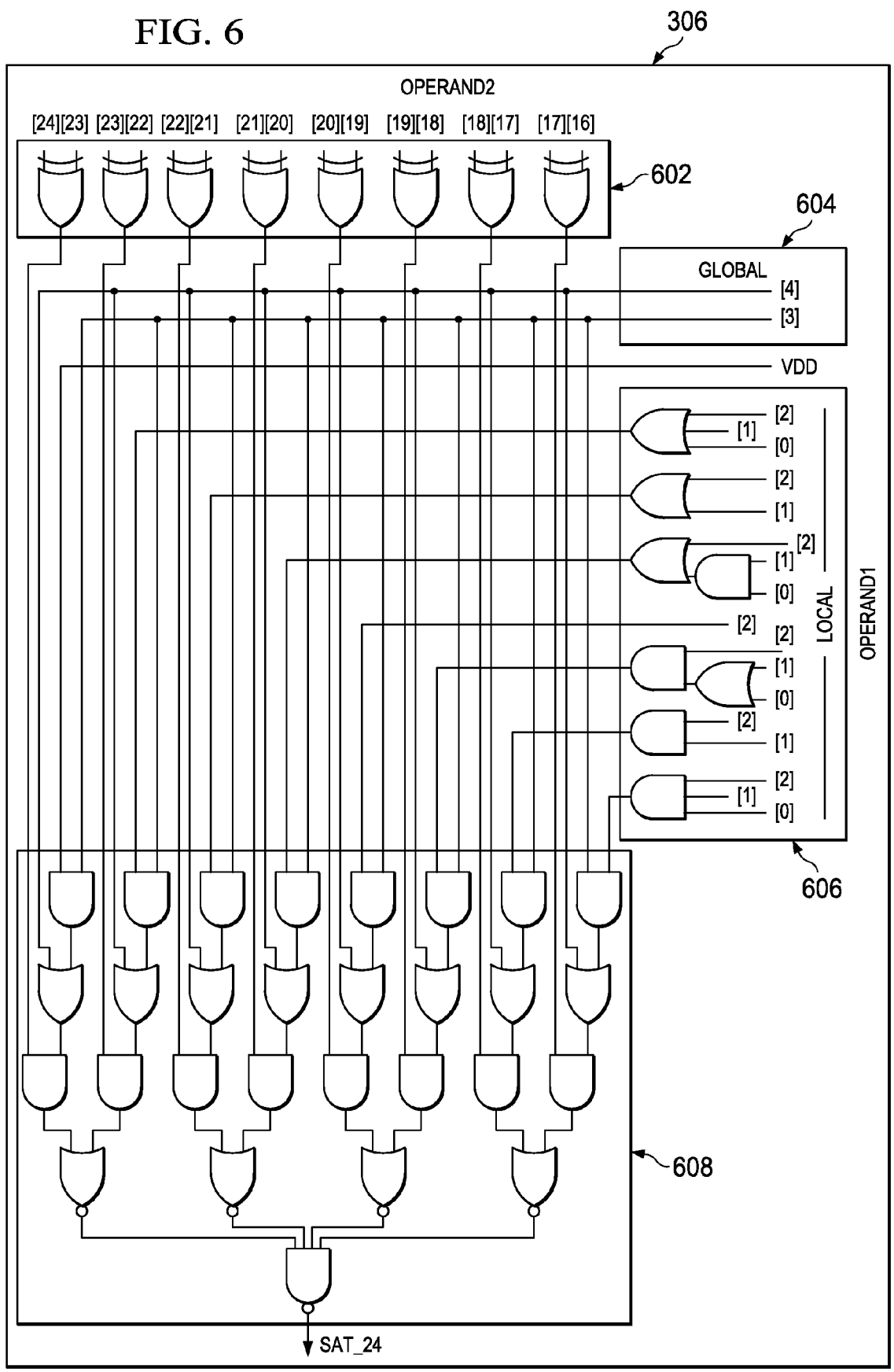
FIG. 6 is a block diagram illustrating a higher order sub-unit of a reduced level shift overflow detection unit in accordance with embodiments of the disclosure.

FIG. 6 is a block diagram illustrating a sub-unit of a reduced level shift overflow detection unit in accordance with embodiments of the disclosure. In particular, overflow detection sub-unit 306 is illustrated. As shown in FIG. 6, overflow detection sub-unit 306 comprises a change detector 602, a global shift amount decoder 604, a local shift amount decoder 606, and a saturation logic unit 608. Change detector 602 operates by performing a logical comparison between pairs of adjacent bits of the data word to be shifted. The logical comparison can be an XOR (using logical exclusive-OR gates) operation or similar operation using discrete transistors. As illustrated, pairs of adjacent bits of the shift data word are logically compared with each other. Thus, an additional higher order data word bit (bit 24) is used by the change detector 602. For example, the lowest bit of the next higher saturation logic unit (bit 24 of the shift data word of overflow detection sub-unit 306) is provided to overflow detection sub-unit 306 to be logically XORed with bit 23 of the shift data word. The XOR operation is performed to detect a "change" in the bits, namely, that the presence of a "1" in the shifted data is detected. If there is a change at a specific bit position within the set, this potentially results in a local overflow out of the 8-bit set when the shift amount is large enough.

The local shift amount decoder 606 is used to determine whether the lower order bits of the shift amount are large enough such that a detected "change" in the bits of the data word (operand2) is large enough to cause an overflow within overflow detection sub-unit 306. This condition is detected by performing a logical AND of the change detection and the minimum shift amount required for this to result in a local overflow out of the 8-bit set. The detection of such an overflow out of this 8-bit set of operand2 is the logical OR of the individual overflow conditions for each bit position within the 8-bit set. Bits [24:16] of operand2 and bits [2:0] of operand1 are used for detecting the local overflow out of this set.

The global shift amount decoder 604 is used to determine whether the higher order bits of the shift amount are large enough such that a detected "change" in the bits of the data word (operand2) is large enough to cause an overflow condition when the overflow detection sub-units are combined. For example, global[3] and/or global[4] must be set "high" in order for a shift amount from overflow detection sub-unit 306 to overflow reduced-level shift overflow detection unit 300. Additionally, the logical function of global shift amount decoder 604 is combined with the logical function of saturation logic unit 608 to detect whether the global shift amount is also large enough to cause an overflow in all less significant overflow detection sub-units (in particular, overflow detection sub-units 302 and 304). This additional functionality captures overflows in the event that the number of bits of entire data word to be shifted (operand2) is not evenly divisible by the set size (for example, note that 31 modulo 8 is 7 and that local shift amount decoder 606 does not by itself handle overflow detection for the highest bit of the set).

An overflow is thus generated when the change detector 602 indicates a change in logic state between adjacent pairs of bits of received set of bits of the shift data and when the received shift amount is greater than eight bits and when the received shift amount is sufficiently large enough to cause a bit associated with a detected change in logic state between adjacent pairs of bits of received set of bits of the shift data to overflow a most significant level detection sub-unit (such as overflow detection sub-unit 308, described below).

The outputs of the change detector 602, the global shift amount decoder 604, and the local shift amount decoder 606 are combined using the saturation logic unit 608. The saturation logic unit 608 output generates a signal to indicate that a local overflow out of this set has been detected (handled by overflow detection sub-unit 306). The output of the saturation logic unit 608 is logically combined with the outputs of other saturation logic units of other overflow detection sub-units using the reduced-level shift overflow detection unit 300, which is described above with respect to FIG. 3.

Figure 7:
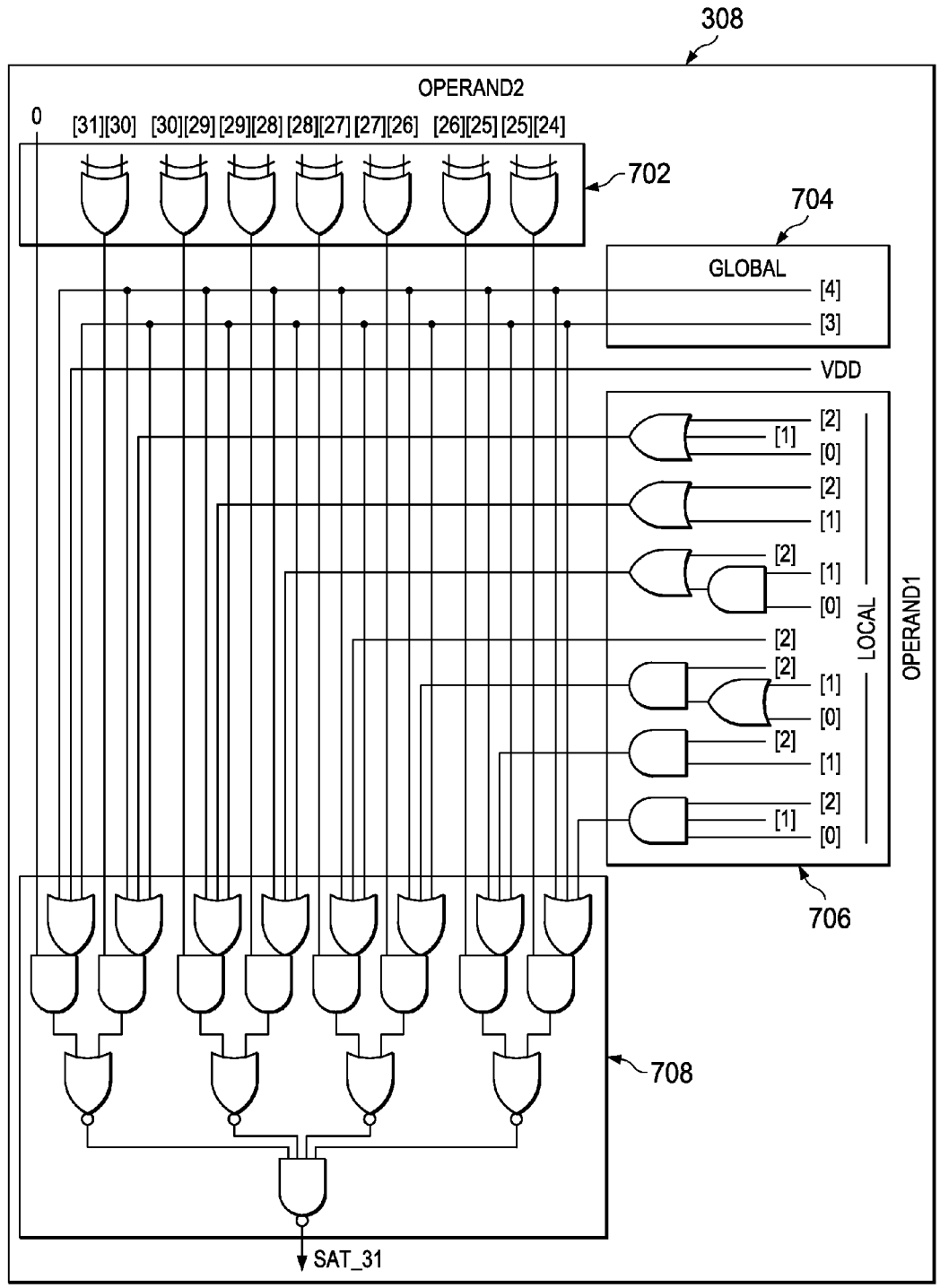
FIG. 7 is a block diagram illustrating a highest order sub-unit of a reduced level shift overflow detection unit in accordance with embodiments of the disclosure.

FIG. 7 is a block diagram illustrating a sub-unit of a reduced level shift overflow detection unit in accordance with embodiments of the disclosure. In particular, overflow detection sub-unit 308 is illustrated. As shown in FIG. 7, overflow detection sub-unit 308 comprises a change detector 702, a global shift amount decoder 704, a local shift amount decoder 706, and a saturation logic unit 708. Change detector 702 operates by performing a logical comparison between pairs of adjacent bits of the data word to be shifted. The logical comparison can be an XOR (using logical exclusive-OR gates) operation or similar operation using discrete transistors. As illustrated, pairs of adjacent bits of the shift data word are logically compared with each other. Thus, an additional higher order bit (set to a "0" logic value) is used by the change detector 702 of overflow detection sub-unit 308 to be logically XORed with bit 31 of the shift data word. The XOR operation is performed to detect a "change" in the bits, namely, that the presence of a "1" in the shifted data is detected. If there is a change at a specific bit position within the set, this potentially results in a local overflow out of the 8-bit set when the shift amount is large enough.

The local shift amount decoder 706 is used to determine whether the lower order bits of the shift amount are large enough such that a detected "change" in the bits of the data word (operand2) is large enough to cause an overflow within overflow detection sub-unit 308. This condition is detected by performing a logical AND of the change detection and the minimum shift amount required for this to result in a local overflow out of the 8-bit set. The detection of such an overflow out of this 8-bit set of operand2 is the logical OR of the individual overflow conditions for each bit position within the 8-bit set. Bits [31:24] of operand2 and bits [2:0] of operand1 are used for detecting the local overflow out of this set.

The global shift amount decoder 704 is used to determine whether the higher order bits of the shift amount are large enough such that a detected "change" in the bits of the data word (operand2) is large enough to cause an overflow condition when the overflow detection sub-units are combined. For example, global[3] and/or global[4] must be set "high" in order for a shift amount from overflow detection sub-unit 308 to overflow reduced-level shift overflow detection unit 300. Additionally, the logical function of global shift amount decoder 704 is combined with the logical function of saturation logic unit 708 to detect whether the global shift amount is also large enough to cause an overflow in all less significant overflow detection sub-units (in particular, overflow detection sub-units 302, 304, and 306). This additional functionality captures overflows in the event that the number of bits of entire data word to be shifted (operand2) is not evenly divisible by the set size (for example, note that 31 modulo 8 is 7 and that local shift amount decoder 706 does not by itself handle overflow detection for the highest bit of the set).

An overflow is thus generated when the change detector 702 indicates a change in logic state between adjacent pairs of bits of received set of bits of the shift data and when at least one of the received shift amount is greater than or equal to the number of bits of the less-significant overflow detection sub-units that are not shared with the overflow detection sub-unit 308 or the received shift amount is sufficiently large enough to cause a bit associated with a detected change in logic state between adjacent pairs of bits of received set of bits of the shift data to overflow the overflow detection sub-unit 308.

The outputs of the change detector 702, the global shift amount decoder 704, and the local shift amount decoder 706 are combined using the saturation logic unit 708. The saturation logic unit 708 output indicates a detection of a local overflow out of this set (handled by overflow detection sub-unit 308). The output of the saturation logic unit 708 is logically combined with the outputs of other saturation logic units of other overflow detection sub-units using the reduced-level shift overflow detection unit 300, which is described above with respect to FIG. 3.

The organization of the subunits (and the arrangement of each subunit) in the reduced-level shift overflow detection unit 300 thus provides (amongst other things) an exponential reduction in the complexity of the logic (and logic levels) over conventional shift overflow detection units. The overflow detection out of the other three sets is similar to that detailed above, and uses various modifications to the logic equations involving the global bits of operand1 as described above. For example, detecting an overflow condition can be performed using at least two sets that are formed by dividing the received shift data word into consecutive ranges of adjacent bits of the received shift data word. Each set comprises at least one bit that is shared with another set, and each set that has a less significant consecutive range of adjacent bits of the received shift data word includes a number of elements that is one greater than a power of two (e.g., 2N+1).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A shift overflow detector, comprising:
a first change detector that is arranged to receive a shift data word and to generate shift indication signals in response to changes in logic state between adjacent pairs of bits of the shift data word;
a first shift amount decoder that is arranged to receive a shift amount, and in response to the received shift amount, provide decoded shift signals to indicate an amount of shifting that corresponds to the received shift amount; and
a first saturation logic unit that is arranged to detect an overflow condition in response to the generated shift indication signals and the decoded shift signals and to provide an indication of the detected overflow condition.

2. The detector of claim 1, wherein the changes in logic state between adjacent pairs of bits are detected by performing a logical exclusive-OR operation on each pair of adjacent bits of the shift data word.

3. The detector of claim 1, comprising a first overflow detection sub-unit for detecting an overflow from a first set of bits of the data shift word, wherein the first overflow detection sub-unit comprises the first change detector, the first shift amount decoder, and the first saturation logic unit.

4. The detector of claim 3, comprising a second overflow detection sub-unit for detecting an overflow from a second set of bits of the data shift word, wherein the second set of bits of the data shift word are less significant than the first set of bits of the data shift word, wherein the lowest bit of the first set of data bits is the same as the highest bit of the second set of data bits.

5. The detector of claim 4, wherein the first overflow detection sub-unit is arranged to generate a first sub-unit overflow signal when the first change detector indicates a change in logic state between adjacent pairs of bits of the first set of bits of the shift data and when at least one of the received shift amount is greater than or equal to the number of bits in the second set that are not shared with the first set or the received shift amount is sufficiently large enough to cause a bit associated with a detected change in logic state between adjacent pairs of bits of the first set of bits of the shift data to overflow the first overflow detection sub-unit.

6. The detector of claim 4, wherein the second overflow detection sub-unit is arranged to generate a second sub-unit overflow signal when a second change detector indicates a change in logic state between adjacent pairs of bits of the second set of bits of the shift data and when the received shift amount is greater than or equal to the number of bits in the second set that are not shared with the first set and when the received shift amount is sufficiently large enough to cause a bit associated with a detected change in logic state between adjacent pairs of bits of the second set of bits of the shift data to overflow the first overflow detection sub-unit.

7. The detector of claim 3, wherein the detector is arranged to logically combine the first sub-unit overflow signal with the second sub-unit overflow signal to provide an indication of a global overflow from both the first and second overflow detection sub-units.

8. The detector of claim 3, wherein the most significant bit of the first set of bits of the data shift word is exclusively-ORed with a logic value of zero by the first change detector.

9. The detector of claim 3, comprising a second, third, and fourth overflow detection sub-unit each respectively associated with a set of bits of the data shift word, wherein the fourth set of bits of the data shift word is less significant than the third set of bits of the data shift word, which is less significant than the second set of bits of the data shift word, which is less significant than the first set of bits of the data shift word, wherein the lowest bit of each set of data bits of the data shift word is the same as the highest bit of the next less significant set of data bits.

10. The detector of claim 9, wherein the first set of data bits of the data shift word includes eight bits and the second, third, and fourth sets each comprise nine bits, wherein most significant bit of each of the second, third, and fourth set of data bits of the data shift word is also the least significant bit of the first, second, and third set of data bits of the data shift word respectively.

11. The detector of claim 9, wherein the first overflow detection sub-unit is arranged to generate a first sub-unit overflow signal when a change in logic state between adjacent pairs of bits of the first set of bits of the shift data is detected and when at least one of the received shift amount is greater than or equal to the number of bits in the shift data word that are not included with the first set or the received shift amount is sufficiently large enough to cause a bit associated with a detected change in logic state between adjacent pairs of bits of the first set of bits of the shift data to overflow the first overflow detection sub-unit, and wherein the second, third and fourth overflow detection sub-units are arranged to generate a respective sub-unit overflow signal when a change in logic state between adjacent pairs of bits of respective set of bits of the shift data is detected and when the received shift amount is sufficiently large enough to cause a bit associated with a detected change in logic state between adjacent pairs of bits of respective set of bits of the shift data to overflow the first overflow detection sub-unit.

12. The detector of claim 11, wherein the detector is arranged to logically combine the first sub-unit overflow signal with second, third, and fourth sub-unit overflow signals respectively generated by the second, third, and fourth sub-unit overflow signals to provide an indication of a global overflow from the first second, third, and fourth overflow detection sub-units.

13. A processing system, comprising:
a memory arranged in a substrate for storing instructions to be executed and for storing data to be manipulated; and
at least one processor arranged in the substrate for executing the stored instructions and to manipulate the stored data, the at least one processor comprising a shift detector that is arranged to arranged to receive a shift data word and to generate shift indication signals in response to changes in logic state between adjacent pairs of bits of the shift data word, to receive a shift amount, and in response to the received shift amount, provide decoded shift signals to indicate an amount of shifting that corresponds to the received shift amount, and to detect an overflow condition in response to the generated shift indication signals and the decoded shift signals and to provide an indication of the detected overflow condition.

14. The system of claim 13 wherein the shift detector is arranged to detect changes in logic state between adjacent pairs of bits by performing a logical exclusive-OR operation on each pair of adjacent bits of the shift data word.

15. The system of claim 14 wherein the shift detector comprises the a first overflow detection sub-unit that is arranged to generate a first sub-unit overflow signal when a change in logic state between adjacent pairs of bits of a first set of bits of the shift data associated with the first overflow detection sub-unit is detected and when at least one of the received shift amount is greater than or equal to the number of bits in the shift data word that are not included with the first set or the received shift amount is sufficiently large enough to cause a bit associated with a detected change in logic state between adjacent pairs of bits of the first set of bits of the shift data to overflow the first overflow detection sub-unit.

16. The system of claim 15 wherein the shift detector comprises a second overflow detection sub-unit that is arranged to generate a second sub-unit overflow signal when a change in logic state between adjacent pairs of bits of a second set of bits of the shift data associated with the second overflow detection sub-unit is detected and when the received shift amount is greater than or equal to the number of bits in the second set that are not shared with a more significant set and when the received shift amount is sufficiently large enough to cause a bit associated with a detected change in logic state between adjacent pairs of bits of the second set of bits of the shift data to overflow the first overflow detection sub-unit.

17. The system of claim 16 wherein the indication of the detected overflow condition is generated by logically combining the first sub-unit overflow signal with the second sub-unit overflow signal.

* * * * *